(12) United States Patent
Murata

(10) Patent No.: US 8,677,067 B2
(45) Date of Patent: Mar. 18, 2014

(54) STORAGE SYSTEM AND METHOD FOR CONTROLLING STORAGE SYSTEM

(75) Inventor: Yoshihiro Murata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 13/377,977

(22) PCT Filed: Nov. 30, 2011

(86) PCT No.: PCT/JP2011/006683
§ 371 (c)(1),
(2), (4) Date: Dec. 13, 2011

(87) PCT Pub. No.: WO2013/080254
PCT Pub. Date: Jun. 6, 2013

(65) Prior Publication Data
US 2013/0138880 A1    May 30, 2013

(51) Int. Cl.
*G06F 12/00* (2006.01)
(52) U.S. Cl.
USPC .......................... 711/114; 711/162; 711/170
(58) Field of Classification Search
None
See application file for complete search history.

(56) References Cited

U.S. PATENT DOCUMENTS

| | | | |
|---|---|---|---|
| 2006/0129877 A1* | 6/2006 | Yamamoto et al. | 714/6 |
| 2007/0260642 A1* | 11/2007 | Britton et al. | 707/201 |
| 2008/0282043 A1 | 11/2008 | Yagi et al. | |

FOREIGN PATENT DOCUMENTS

JP    2005-267008 A    9/2005

OTHER PUBLICATIONS

IBM Corporation, "An Architectural Blueprint for Autonomic Computing", Automatic Computing White Paper, Jun. 1, 2005, pp. 1-34.*
IBM Corporation, "An architectural blueprint for autonomic computing", Automatic Computing White Paper, Jun. 1, 2005, pp. 1-34, Hawthorne, NY 10532, USA, www.ginkgo-networks.com/IMG/pdf/AC_Blueprint_White_Paper_V7.pdf.

* cited by examiner

Primary Examiner — Shawn X Gu
(74) Attorney, Agent, or Firm — Volpe and Koenig, P.C.

(57) ABSTRACT

In a storage system in which storage apparatuses communicatively coupled to a host computer are communicatively coupled to SVPs of the storage apparatuses through a management network, virtual SVPs are configured based on resources of the SVPs, and a maintenance environment for constituent elements of the storage apparatuses is provided through the virtual SVP to a maintenance apparatus accessing through the management network. The virtual SVPs share the information held by the SVPs. The virtual SVP performs maintenance and management of the storage apparatuses through a virtual storage apparatus configured based on the resources of at least two of the storage apparatuses. The virtual SVP acquires a data transmission amount for each communication protocol of a network port from a channel control unit, and sets a bandwidth for each communication protocol of the network port based on the acquired data transmission amount.

20 Claims, 17 Drawing Sheets

Fig. 8

MAPPING MANAGEMENT TABLE 800

| VIRTUAL SVP | PHYSICAL SVP | STORAGE APPARATUS | RAID GROUP | LDEV |
|---|---|---|---|---|
| V-SVP1 | SVP1 | XXXX-XX1 | ALL | ALL |
| V-SVP2 | SVP2 | XXXX-XX2 | ALL | ALL |
| V-SVP3 | SVP3 | XXXX-XX3 | ALL | ALL |

Fig. 9

MAPPING MANAGEMENT TABLE 800

| VIRTUAL SVP | PHYSICAL SVP | STORAGE APPARATUS | RAID GROUP | LDEV |
|---|---|---|---|---|
| V-SVP1 | SVP1 | XXXX-XX1 | ALL | ALL |
| | | XXXX-XX2 | 0 | ALL |
| | | | 1 | 0,1 |
| V-SVP2 | SVP2 | XXXX-XX2 | 1 | 2,3 |
| | | | 2,3,4,5 | ALL |
| V-SVP3 | SVP3 | XXXX-XX3 | ALL | ALL |

Fig. 10

MAPPING MANAGEMENT TABLE 800

| VIRTUAL SVP (811) | PHYSICAL SVP (812) | STORAGE APPARATUS (813) | RAID GROUP (814) | LDEV (815) |
|---|---|---|---|---|
| V-SVP1 | SVP1 | XXXX-XX1 | ALL | ALL |
| | | XXXX-XX2 | 0 | ALL |
| | | | 1 | 0,1 |
| V-SVP2 | | XXXX-XX3 | 1 | 2,3 |
| | | | 2,3,4,5 | ALL |
| V-SVP3 | SVP2 | XXXX-XX4 | ALL | ALL |

Fig. 13

MAPPING MANAGEMENT TABLE 800

| VIRTUAL SVP (811) | PHYSICAL SVP (812) | STORAGE APPARATUS (813) | RAID GROUP (814) | LDEV (815) |
|---|---|---|---|---|
| V-SVP1 | SVP1 | R700-001 | ALL | ALL |
| | | R700-002 | 0 | ALL |
| | | | 1 | 0,1 |
| V-SVP2 | SVP2 | R700-002 | 2,3,4,5 | 2,3 (from RAID 1) |
| | | | | ALL (from raid 2~5) |
| V-SVP3 | SVP3 | R700-003 | ALL | ALL |

Fig. 15

FREE CAPACITY MANAGEMENT TABLE 1500

| VIRTUAL SVP 1511 | PHYSICAL SVP 1512 | STORAGE APPARATUS 1513 | RAID GROUP 1514 | RAID GROUP STORAGE CAPACITY(GB) 1515 | LDEV 1516 | LDEV USAGE (GB) 1517 |
|---|---|---|---|---|---|---|
| V-SVP2 | SVP2 | R700-002 | 1 | 300 | 2 | 50 |
| | | | | | 3 | 80 |
| | | | 2 | 200 | 0 | 60 |
| | | | | | 1 | 50 |
| | | | 3 | 300 | 0 | 20 |
| | | | | | 1 | 70 |
| | | | 4 | 500 | 0 | 30 |
| | | | | | 1 | 100 |
| | | | | | 2 | 10 |
| | | | | | 3 | 40 |
| | | | 5 | 100 | 0 | 30 |
| | | | | | 1 | 70 |

Fig. 17

DATA TRANSMISSION RATE
CALCULATION PROCESS S1700

START
↓
CPU ACQUIRES DATA TRANSMISSION AMOUNT FROM CHANNEL CONTROL UNIT — S1711
↓
OBTAIN DATA TRANSMISSION RATE OF PRIORITY GROUP BASED ON DATA TRANSMISSION AMOUNT — S1712
↓
END

Fig. 18

DATA TRANSMISSION RATE
MANAGEMENT TABLE 1800

| PG# (1811) | BW% (BANDWIDTH) (1812) | Priority_# (1813) | Rate% (DATA TRANSMISSION RATE) (1814) |
|---|---|---|---|
| 0 | 60 | 2,3 | 60 |
| 1 | 30 | 0,1,4 | 30 |
| 2 | 10 | 5,6 | 10 |
| 15 | - | 7 | - |

Fig. 20

DATA TRANSMISSION RATE MANAGEMENT TABLE 1800

| PG# | BW% (BANDWIDTH) | Priority_# | Rate% (DATA TRANSMISSION RATE) |
|---|---|---|---|
| 0 | 40 | 2,3 | 40 |
| 1 | 50 | 0,1,4 | 50 |
| 2 | 10 | 5,6 | 10 |
| 15 | – | 7 | – |

STORAGE SYSTEM AND METHOD FOR CONTROLLING STORAGE SYSTEM

TECHNICAL FIELD

The present invention relates to a storage system and a method for controlling the storage system.

BACKGROUND ART

PTL 1 discloses a storage apparatus having a plurality of channel adapters, a plurality of disk adapters, a shared memory, a cache memory, physical disks coupled to the disk adapters, and switches coupling the foregoing constituents to each other. PTL 1 also discloses that a management terminal (management device) coupled to the channel adapters, disk adapters, shared memory and cache memory through a coupling unit in the storage apparatus performs maintenance and management of the storage apparatus such as configuration setup of a physical disk drive, RAID configuration change (such as a change from RAID1 to RAID5), checking of the operation status of the storage apparatus and identification of failure locations, installation of an operating system to be executed by the channel adapter and installation of a microprogram to be executed by the channel adapter or disk adapter.

CITATION LIST

Patent Literature

PTL 1: Japanese Patent Application Publication No. 2005-267008

SUMMARY OF INVENTION

Technical Problem

Although a large number of storage apparatuses are simultaneously operated in a data center, a system center or the like, the target area to be maintained and managed by a single management device included in each of the storage apparatuses is limited. For this reason, when the plurality of storage apparatuses are seen as a unit, there were cases where it could not be necessarily said that the resources of the management devices are effectively utilized.

The present invention has been made in consideration of the foregoing problem. It is a main object of the present invention to provide a storage system capable of effectively utilizing resources of management devices included in individual storage apparatuses, and a method for controlling the storage system.

Solution to Problem

One of the features of the present invention to achieve the foregoing object is a storage system including at least one storage apparatus being communicatively coupled to a host computer through an I/O network, and being configured to perform an I/O process for a storage drive in response to an I/O request sent from the host computer; the storage apparatus including at least one management device each being an information processor and communicatively coupled to constituent elements of the storage apparatus, at least two of the management devices being communicatively coupled to each other through a management network, and the management devices including a management device virtualization mechanism for implementing at least one virtual management device being a virtual object based on resources of the at least two management devices, wherein the virtual management devices provide a maintenance environment for the constituent elements of the storage apparatuses, to a maintenance apparatus as an information processor accessing the virtual management devices through the management network.

Other problems disclosed in the present application and solutions thereto will become apparent from the following description of embodiments and the drawings.

Advantageous Effects of Invention

According to the present invention, resources of management devices included in individual storage apparatuses can be effectively utilized.

BRIEF DESCRIPTION OF DRAWINGS

FIG. 8 is a diagram showing an example of a mapping management table 800.

FIG. 9 is a diagram showing an example of the mapping management table 800.

FIG. 10 is a diagram showing an example of the mapping management table 800.

FIG. 13 is a diagram showing an example of the mapping management table 800.

FIG. 15 is a diagram showing an example of a free capacity management table 1500.

FIG. 17 is a flowchart showing a data transmission rate calculation process S1700.

FIG. 18 is a diagram showing an example of a data transmission rate management table 1800.

FIG. 20 is a diagram showing an example of the data transmission rate management table 1800.

DESCRIPTION OF EMBODIMENTS

Embodiments of the present invention are described below with reference to the drawings.

Figure 1:
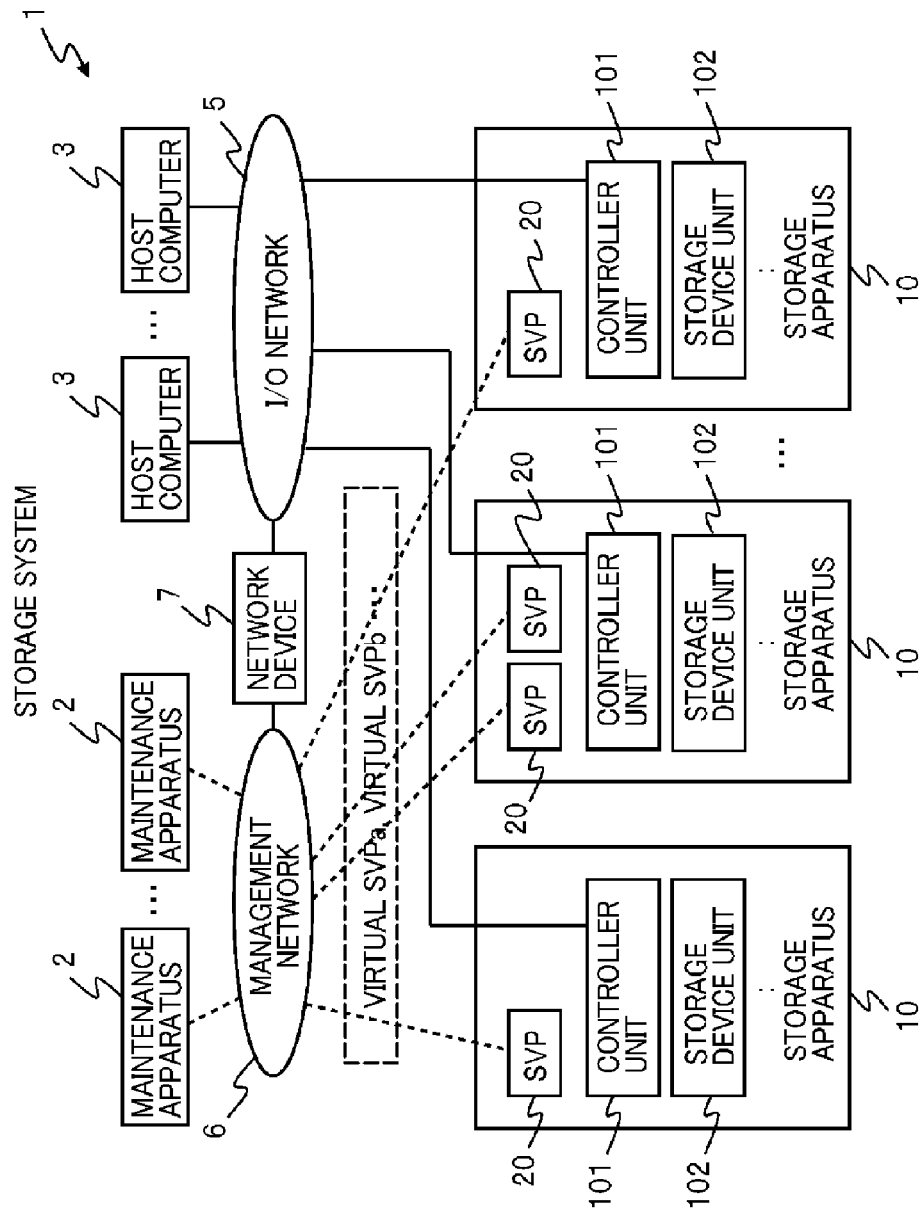
FIG. 1 is a diagram showing a schematic configuration of a storage system 1.

FIG. 1 shows a schematic configuration of a storage system 1 to be described as an embodiment. As shown in FIG. 1, the storage system 1 includes one or more storage apparatuses 10, one or more host computers 3, and one or more maintenance apparatuses 2.

The host computer 3 and the storage apparatus 10 are communicatively coupled to each other through an I/O network 5. The I/O network 5 is, for example, a SAN (Storage Area Network), a LAN (Local Area Network), a WAN (Wide Area Network), the Internet or the like, and is configured using a network switch such as a switching hub or a router. The I/O network 5 may also be configured using one or more network switches (e.g., CEE (Converged Enhanced Ethernet)-compatible network switches) capable of setting a bandwidth of a network port for each of communication protocols (such as TCP/IP, FCoE (Fibre Channel over Ethernet) and iSCSI (Internet Small Computer System Interface)) used in the I/O network 5.

The storage apparatus 10 performs data write/read (hereinafter referred to as an I/O process) into/from a storage drive 22 to be described later in response to an I/O request (such as a data write request and a data read request) sent from the host computer 3 through the I/O network 5. Then, the storage apparatus 10 sends a result of the I/O process (such as a data write completion notice and data read in response to the data read request) back to the host computer 3.

The storage apparatus 10 includes one or more management devices (hereinafter referred to as SVP 20 (SVP: Service Processor)) coupled to a management network 6, one or more controller units 101, and one or more storage device units 102.

The SVP 20 is an information apparatus having at least a central processing unit and a memory, and is configured using, for example, an information apparatus such as a personal computer. The SVP 20 performs maintenance and management of constituent elements (hardware elements and software elements) included in the storage apparatus 10 which the SVP 20 is in charge of. For example, the SVP 20 performs configuration setup of a storage drive 22 to be described later, RAID group setting, checking of the operation status of the storage apparatus 10 and identification of failure locations, installation of an operating system to be executed by a channel control unit 12 to be described later, installation of a microprogram to be executed by the channel control unit or a disk control unit to be described later, and the like.

The management network 6 is, for example, a LAN, a WAN, the Internet, a public telecommunication network, a dedicated line network or the like, and is configured using a network switch such as a switching hub or a router. The management network 6 is coupled to the I/O network 5 through a network device 7 that is a network switch such as a switching hub or a router.

The maintenance apparatus 2 is an information apparatus communicatively coupled to the SVP 20 through the management network 6. The maintenance apparatus 2 communicates with the SVP 20, and provides a user or operator (hereinafter referred to as an administrator) of the storage system 1 with a user interface (GUI (Graphical User Interface), CLI (Command Line Interface) or the like) for performing maintenance and management of the storage system 1. The maintenance apparatus 2 is configured using, for example, a personal computer.

Note that, as shown in FIG. 1, in the storage system 1 of the present embodiment, virtual SVPs (virtual management devices) (virtual SVPa, virtual SVPb, . . . ) are implemented as virtual objects by using resources (hardware resources and software resources) of one or more SVPs 20. The virtual SVP provides the maintenance apparatus 2 with a maintenance environment for the constituent elements of the storage apparatus 10. The maintenance apparatus 2 performs maintenance and management of the storage system 1 through the virtual SVP. Note that the relationship between the virtual SVP and the SVP 20 is not limited to a one-to-one relationship.

Figure 2:
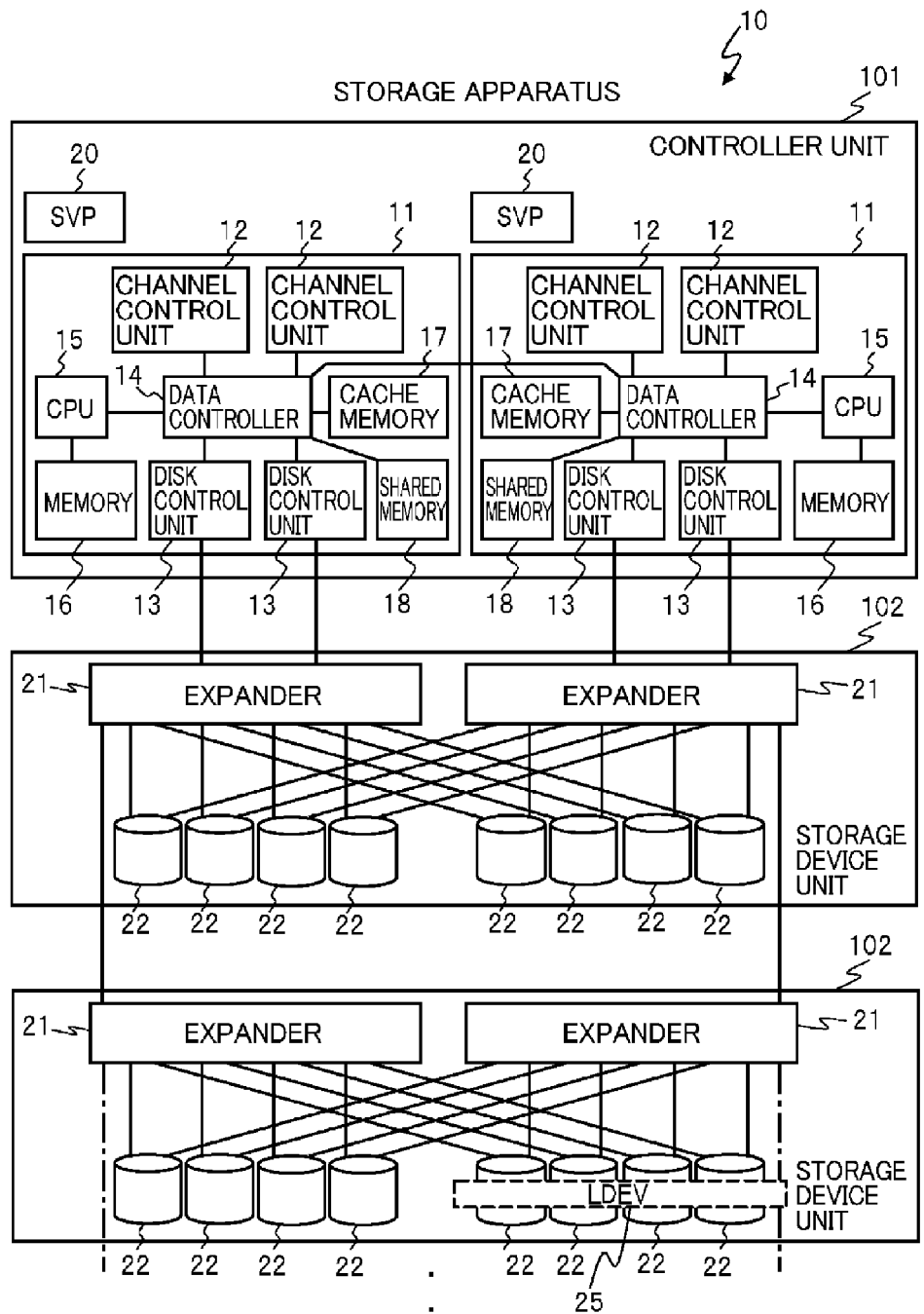
FIG. 2 is a diagram showing a hardware configuration of a storage apparatus 10.

FIG. 2 shows a hardware configuration of the storage apparatus 10. As shown in FIG. 2, the storage apparatus 10 includes the controller unit 101 and one or more storage device units 102. The storage device units 102 are coupled to the controller unit 101 in a cascade manner. More storage device units 102 or less storage device units 102 can be coupled to the controller unit 101 according to the needs of the user.

The controller unit 101 includes one or more controllers 11 and one or more SVPs 20. The controller unit 101 shown in FIG. 2 includes two controllers 11 and two SVPs 20 corresponding to the controllers 11, respectively.

The controller 11 includes, as its constituent elements, at least one or more channel control units 12, one or more disk control units 13, a data controller 14, a CPU 15, a memory 16, a cache memory 17 and a shared memory 18.

Each of the channel control units 12 includes one or more network ports, and communicates with apparatuses such as the host computer 3 through the I/O network 5. The channel control unit 12 receives the I/O request described above. Moreover, a response to the I/O request described above is transmitted from the channel control unit 12 to the host computer 3.

Note that the channel control unit 12 may be compatible with the CEE described above. In this case, the administrator can set a bandwidth of the network port of the channel control unit 12 for each of the communication protocols by accessing the virtual SVP from the maintenance apparatus 2. Moreover, as described later, the channel control unit 12 may include a function to acquire a data transmission rate, by communication protocol, of a frame (packet) passing through each network port for each predetermined time or unit time.

The disk control unit 13 communicates with an expander 21 in the storage device unit 102 when the storage device unit 102 writes data into the storage drive 22 or reads data from the storage drive 22.

The data controller 14 is configured using, for example, a CPU, an MPU (Micro Processing Unit), a DMA (Direct Memory Access) or the like. The data controller 14 is responsible for data transfer between at least two of the channel control unit 12, the cache memory 17 and the disk control unit 13. The data controller 14 performs data transfer in staging/destaging of the read data read from the storage drive 22 or write data to be written into the storage drive 22 to the cache memory 17.

The cache memory 17 is configured using a RAM, ROM, NVRAM or the like. The cache memory 17 temporarily stores the data to be written into the storage drive 22 (hereinafter referred to as the write data) or the data read from the storage drive 22 (hereinafter referred to as the read data) in the I/O process.

The shared memory 18 is configured using a RAM, ROM, NVRAM or the like. The shared memory 18 stores data to be used for controlling processes for the I/O request, for example.

The CPU 15 performs control and monitoring of the hardware implemented in the controller 11. The memory 16 stores programs to be executed during the control and monitoring described above, and data used for the control and monitoring described above.

Figure 3:
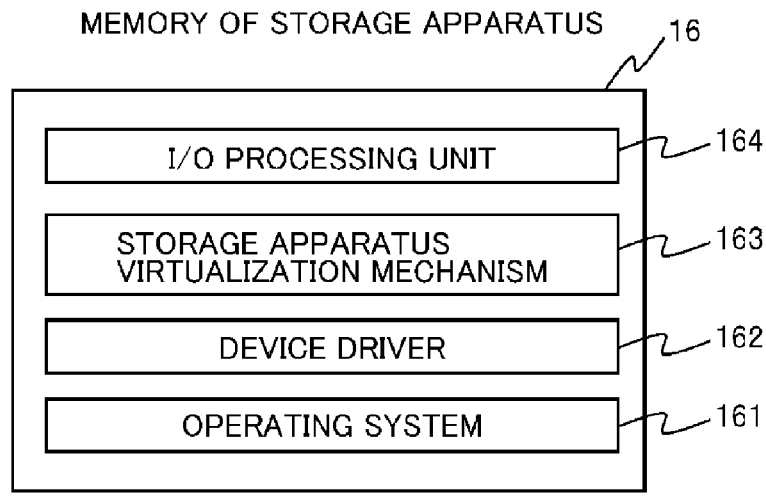
FIG. 3 is a diagram showing main programs stored in a memory 16 of a controller 11.

FIG. 3 shows main programs stored in the memory 16 of the controller 11. As shown in FIG. 3, the memory 16 stores a program 161 for configuring an operating system, a program 162 for configuring a device driver, a program 163 for configuring a storage apparatus virtualization mechanism, and a program 164 for configuring an I/O processing unit. The functions of the operating system, device driver, storage apparatus virtualization mechanism and I/O processing unit are implemented by the data controller 14 (or the CPU 15) loading and executing the programs stored in the memory 16.

The storage apparatus virtualization mechanism among the above functions configures a virtual storage apparatus as a virtual object by using the hardware resources of the storage apparatus 10. The virtual storage apparatus provides the host computer 3 with an access environment of the storage apparatus 10. Also, the storage apparatus virtualization mechanism includes a function to show the storage areas of the storage drives 22 in different storage apparatuses 10 as a storage area of a same virtual storage apparatus to the host computer 3 and the maintenance apparatus 2 (hereinafter referred to as external coupling), i.e., an external coupling function that is a function to allow each of the storage drives 22 in the plurality of storage apparatuses 10 to be accessed through access to one virtual storage apparatus. The storage apparatus virtualization mechanism uses the external coupling function to provide an integrated access environment to the storage drives 22 to be accessed for I/O processes from each of the plurality of storage apparatuses 10.

The above external coupling is performed, for example, as follows. Specifically, the storage apparatus 10 provided with the storage area (hereinafter also referred to as a recipient storage apparatus) manages the location of the storage area provided by a different storage apparatus 10 (hereinafter also referred to as a provider storage apparatus) in association with an address space of a storage area provided to the host computer 3 by the storage apparatus 10 itself. Here, the location of the storage area is represented by an identifier of the different storage apparatus 10, an identifier of a network port of a channel control unit of the provider storage apparatus, an identifier of an LDEV 25 to be described later in the provider storage apparatus. Upon receipt of a first I/O request targeted for the storage area provided by the provider storage apparatus from the host computer 3, the recipient storage apparatus issues a second I/O request to the provider storage apparatus targeting at the aforementioned location associated with the storage area. Upon receipt of the second I/O request, the provider storage apparatus performs an I/O process in response to the request, and then returns a response to the recipient storage apparatus. Upon receipt of the response from the provider storage apparatus, the recipient storage apparatus returns, to the host computer 3, a response to the first I/O request based on the received response.

The I/O processing unit shown in FIG. 3 performs the I/O process in response to the I/O request received from the host computer 3. This I/O processing is performed, for example, in the following way.

More specifically, when the channel control unit 12 receives a data write request transmitted from the host computer 3, the channel control unit 12 first notifies the data controller 14 to that effect. Then, the data controller 14, when notified, generates a drive write request, transmits the generated request to the disk control unit 13, and stages write data attached to the data write request into the cache memory 17. Upon receipt of the drive write request, the disk control unit 13 registers the received drive write request in a write process queue.

The data controller 14 reads the drive write request as needed from the write process queue. Moreover, the data controller 14 reads write data specified by the read drive write request from the cache memory 17, and writes the read write data into the storage drive 22. The disk control unit 13 sends a report indicating that writing of the write data is completed for the drive write request (completion report) to the data controller 14. Upon receipt of the report, the data controller 14 notifies the channel control unit 12 to that effect. Then, the channel control unit 12, when notified, transmits a completion report to the host computer 3.

Moreover, when the channel control unit 12 receives the data read request transmitted from the host computer 3, the channel control unit 12 notifies the disk control unit 13 to that effect. The disk control unit 13, when notified, reads data specified by the data read request (e.g., data specified by an LBA (Logical Block Address) or a data length) from the storage drive 22. However, when there already exists read data in the cache memory 17 (i.e., the data is already staged), reading from the storage drive 22 is omitted.

The data controller 14 then writes (stages) the data read by the disk control unit 13 into the cache memory 17. Thereafter, the data controller 14 transfers the data written in the cache memory 17 to the channel control unit 12 on an as-needed basis. The channel control unit 12 receives the read data transmitted from the data controller 14, and transmits the received read data to the host computer 3.

Figure 4:
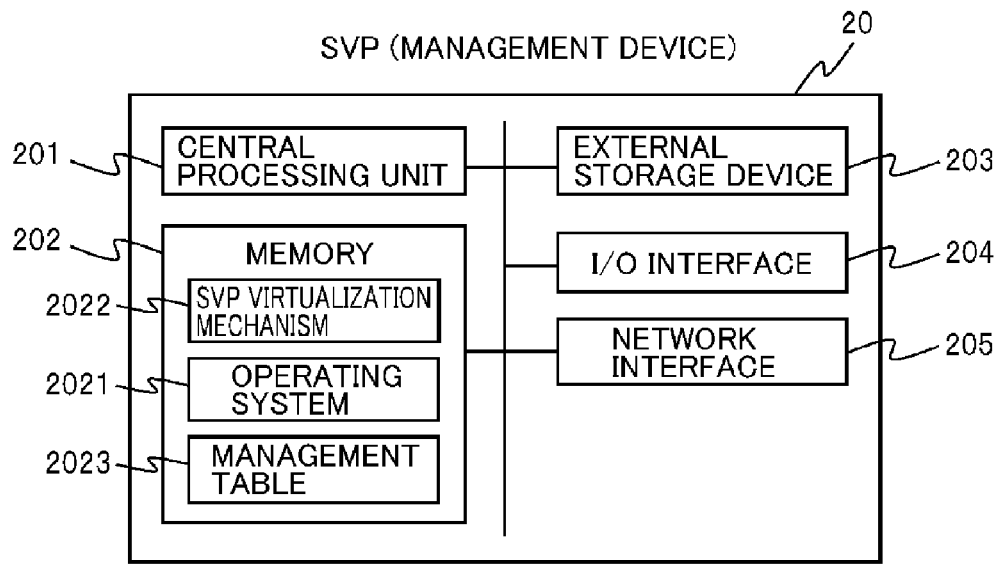
FIG. 4 is a diagram showing a configuration of a SVP 20.

FIG. 4 shows a configuration of the SVP 20. As shown in FIG. 4, the SVP 20 includes hardware including a central processing unit 201, a memory 202, an external storage device 203, an I/O interface 204, and a network interface 205.

The central processing unit 201 is configured using a CPU, MPU or the like. The memory 202 is configured using a RAM, ROM, NVRAM or the like. The external storage device 203 is a hard disk drive, a semiconductor storage unit (SSD (Solid State Drive)) or the like. The I/O interface 204 is a keyboard, numeric keypad, touch panel, switch, LED, liquid crystal panel or the like. The network interface 205 is an NIC (Network Interface Card) or the like.

The memory 202 (or the external storage device 203) in the SVP 20 stores a program 2021 for configuring an operating system, a program 2022 for configuring an SVP virtualization mechanism, and a management table 2023. The operating system and the SVP virtualization mechanism are implemented by the central processing unit 201 reading and executing the programs 2021 and 2022.

The SVP virtualization mechanism configures a virtual SVP by using a host OS with which the virtual SVP runs as middleware of the operating system, hypervisor with which the virtual SVP runs independently of the operating system installed in the hardware, or the like.

The management table 2023 manages information concerning management of the storage system 1 and management of the constituent elements of the storage apparatus 10.

The storage device unit 102 shown in FIG. 2 includes one or more expanders 21 and one or more storage drives 22.

The expander 21 relays communication (interconnection) performed between the disk control unit 13 in the controller 11 and the storage drive 22. The expander 21 also functions as a device expansion switch for communicatively coupling the storage drives 22 to each other. The expander 21 forms a tree-shaped network topology having the disk control unit 13 as a root. Moreover, the expander 21 functions as an initiator or a target in the protocol such as SMP (Serial Management Protocol), SSP (Serial SCSI Protocol) and STP (Serial ATA tunneling Protocol).

The storage drive 22 is, for example, a hard disk drive (such as SAS (Serial Attached SCSI), SATA (Serial ATA), FC (Fibre Channel), PATA (Parallel ATA) and SCSI (Small Computer System Interface)) or a semiconductor storage device (SSD).

The storage apparatus 10 provides the host computer 3 with a storage area using a logical storage area as a unit. Specifically, the logical storage area is provided by controlling the storage drive 22 using a RAID (Redundant Arrays of Inexpensive (or Independent) Disks) configuration (e.g., RAID 4 to 6). This logical storage area is provided as a logical device (hereinafter referred to as LDEV 25) configured using a RAID group (parity group).

The storage apparatus 10 can also provide the host computer 3 with a logical storage area (also called LU (Logical Unit or Logical Volume)) configured using the LDEV 25. Each LU has a unique identifier (hereinafter referred to as LUN) attached thereto. The storage apparatus 10 stores a relation between the LU and the LDEV 25. The storage apparatus 10 specifies the LDEV 25 corresponding to the LU based on such a relation. Moreover, the storage apparatus 10 specifies the LU corresponding to the LDEV 25 based on such a relation.

Note that the storage apparatus 10 may include a function to provide the host computer 3 with a virtualized LU (hereinafter referred to as a virtual LU) which is provided by thin provisioning, in addition to the LU described above.

Figure 5:
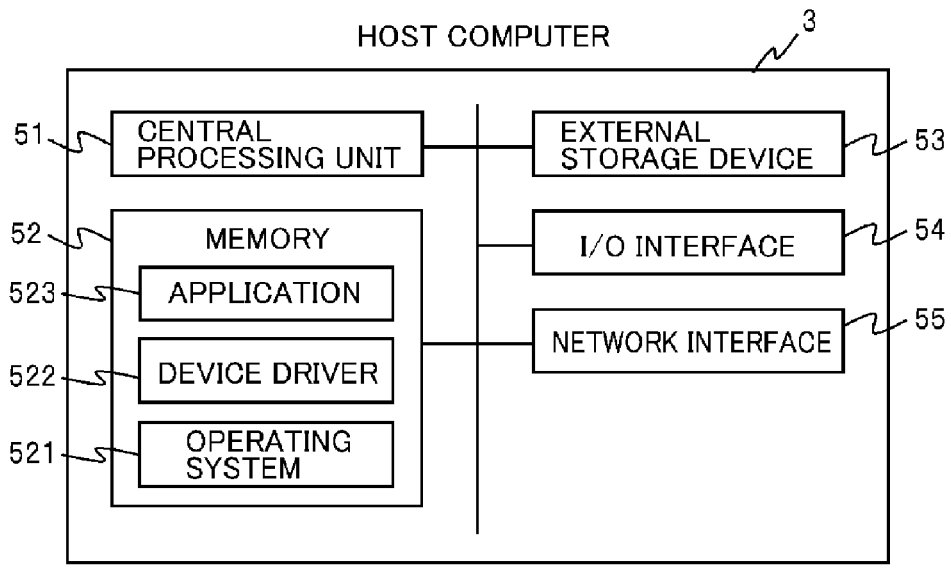
FIG. 5 is a diagram showing a configuration of a host computer 3.

FIG. 5 shows a configuration of the host computer 3. As shown in FIG. 5, the host computer 3 includes a central processing unit 51, a memory 52, an external storage device 53, an I/O interface 54, and a network interface 55. The central processing unit 51 is configured using a CPU, MPU or the like. The memory 52 is configured using a RAM, ROM, NVRAM or the like. The external storage device 53 is a hard disk drive, a semiconductor storage unit (SSD) or the like. The I/O interface 54 is a keyboard, mouse, touch panel, liquid crystal monitor or the like. The network interface 55 is an interface for coupling the host computer 3 to the I/O network 5, and is configured using a HBA (Host Bus Adapter), an NIC or the like.

The memory 52 (or the external storage device 53) in the host computer 3 stores a program 521 for configuring an operating system, a program 522 for configuring a device driver, a program 523 for configuring an application to use the storage apparatus 10 as a storage location of files and data, and the like. The functions of the operating system, device driver and application are implemented by the central processing unit 51 reading and executing the programs 521, 522 and 523.

Figure 6:
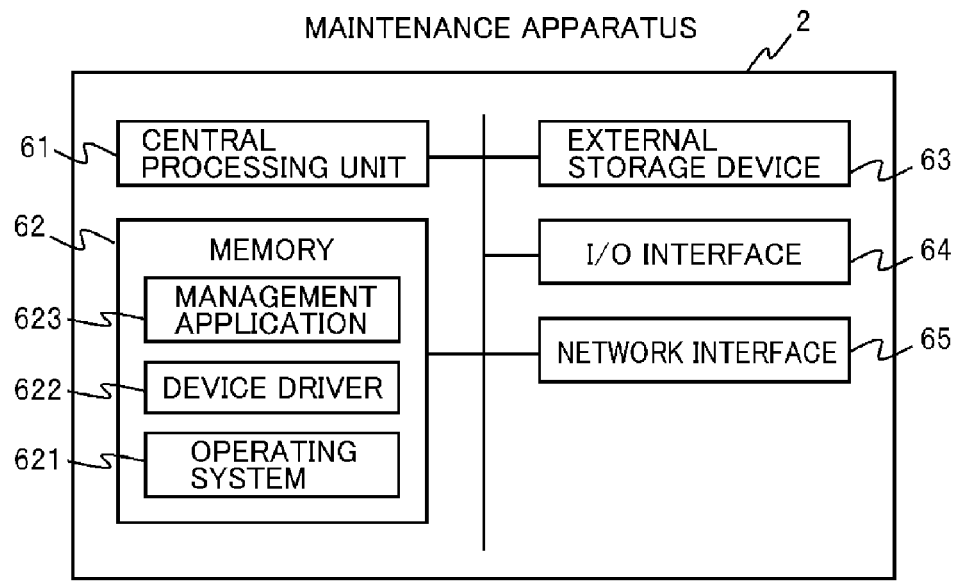
FIG. 6 is a diagram showing a configuration of a maintenance apparatus 2.

FIG. 6 shows a configuration of the maintenance apparatus 2. As shown in FIG. 6, the maintenance apparatus 2 includes a central processing unit 61, a memory 62, an external storage device 63, an I/O interface 64, and a network interface 65. The central processing unit 61 is configured using a CPU, MPU or the like. The memory 62 is configured using a RAM, ROM, NVRAM or the like. The external storage device 63 is a hard disk drive, a semiconductor storage unit (SSD) or the like. The I/O interface 64 is a keyboard, mouse, touch panel, liquid crystal monitor or the like. The network interface 65 is an interface for coupling the maintenance apparatus 2 to the management network 6, and is configured using an NIC or the like.

As shown in FIG. 6, the memory 62 (or the external storage device 63) in the maintenance apparatus 2 stores a program 621 for configuring an operating system, a program 622 for configuring a device driver, a program 623 for configuring an application (hereinafter referred to as a management application) to provide an environment for maintenance or management of the storage system 1 through the virtual SVP, and the like. The functions of the operating system, device driver and management application are implemented by the central processing unit 61 loading and executing the programs 621, 622 and 623.

Figure 7:
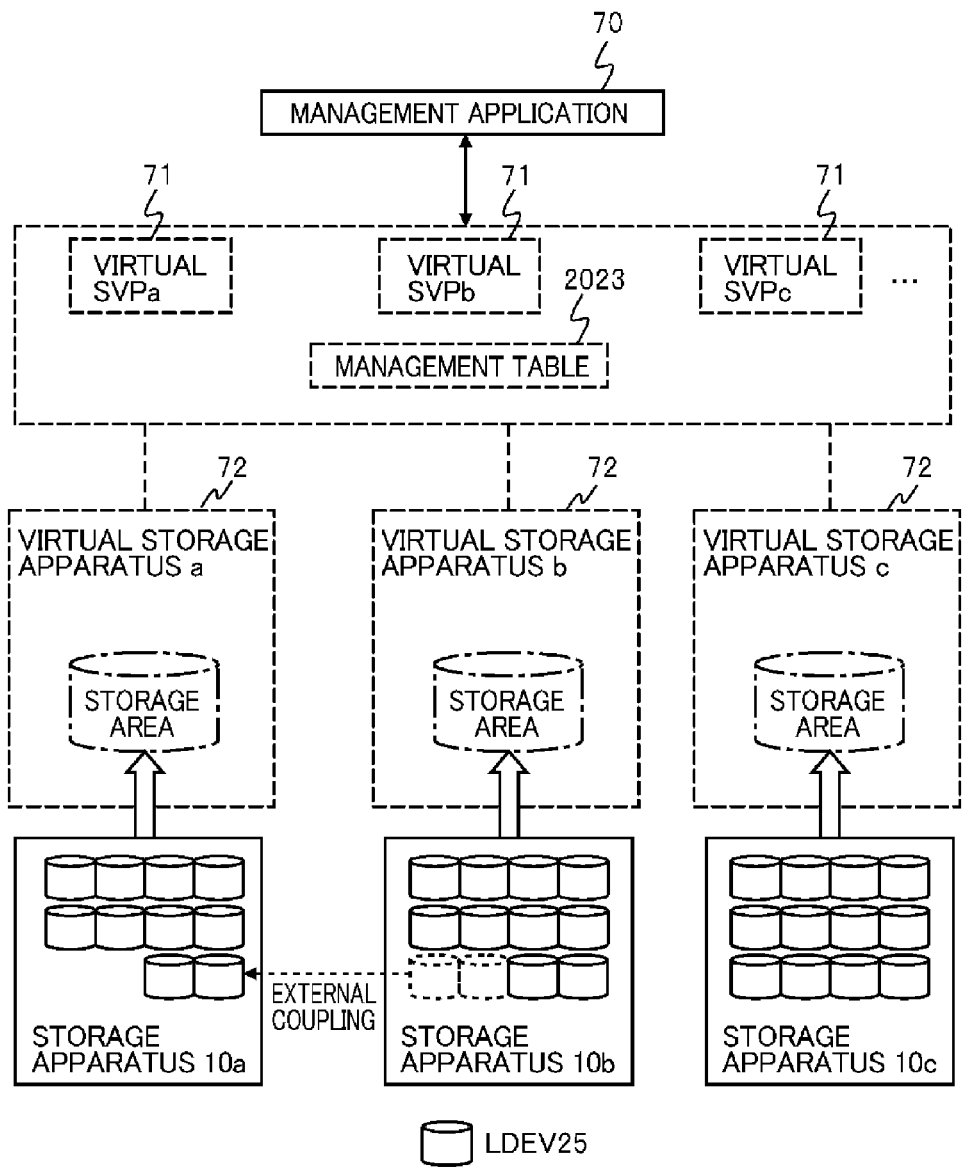
FIG. 7 is a diagram showing a relationship between a virtual SVP 71 and a virtual storage apparatus 72.

FIG. 7 shows a relationship between a virtual SVP 71 and a virtual storage apparatus 72 when a management application 70 run by the program 623 in the maintenance apparatus 2 performs maintenance and management of the storage apparatus 10 through the virtual SVP 71. As shown in FIG. 7, the management application 70 performs maintenance and management of the storage apparatus 10 by targeting at the virtual storage apparatus 72 provided by the storage apparatus virtualization mechanism in the storage apparatus 10.

As described above, the storage apparatus virtualization mechanism includes the external coupling function to show the storage areas of the storage drives 22 in different storage apparatuses 10 as a storage area of the same virtual storage apparatus 72 to the host computer 3 and the maintenance apparatus 2. Thus, the extent of maintenance and management by a certain virtual SVP 71 is not necessarily limited to a specific storage apparatus 10. For example, a virtual storage apparatus a shown in FIG. 7 shows, to the host computer 3 and the maintenance apparatus 2, the LDEV 25 provided by a storage apparatus 10b through external coupling as its own storage area, in addition to the LDEV 25 provided by a storage apparatus 10a. Thus, for example, in the case shown in FIG. 7, the extent of maintenance and management by the virtual SVPa through access to the virtual storage apparatus a is the storage apparatus 10a and a part of the storage apparatus 10b.

Moreover, the virtual SVPs 71 share a part of or all of the contents of the management table 2023 held by each SVP 20 in its memory 202. The SVP virtualization mechanism of each SVP 20 exchanges information with the SVP virtualization mechanism of another SVP 20 by communicating therewith through the management network 6, thereby sharing, in real time, the information required to configure the virtual SVP 71 among the information held in the management table 2023.

Note that, conventionally, the SVPs 20 are tied to each storage apparatus 10, which limits the extent of maintenance and management by each of the SVPs 20. As a result, the range of the own storage apparatus 10 to be managed differs from that of the storage apparatus (the virtual storage apparatus 72 configured by external coupling) recognized by the host computer 3. This has complicated the management.

For example, it is assumed that the storage apparatus 10a has the SVP 20a, the storage apparatus 10b has the SVP 20b, and the LDEVb of the storage apparatus 10b is externally coupled to the storage apparatus a. In this case, the LDEVb is recognized as the LDEV 25 of the storage apparatus 10a by a higher-level device, but is actually configured by the storage drive 22 in the storage apparatus 10b. For this reason, in order to check the status of the LDEVb, it is required to access the SVP 20b in the storage apparatus 10b.

Moreover, if a failure occurs in the LDEVb, the administrator needs to first recognize that the storage drive 22 forming the LDEVb is in the storage apparatus 10b by accessing the SVP 20a in the storage apparatus 10a, and thereafter replace the storage drive 22 forming the LDEVb by accessing the SVP 20b in the storage apparatus 10b, and then notify that the replacement of the storage drive 22 is completed by accessing the SVP 20a in the storage apparatus 10a.

On the other hand, in the storage system 1 of the present embodiment, since the virtual SVPs 71 share the management table 2023 maintained up to date, the administrator can check the status of the LDEV 25 only by accessing any of the virtual SVPs 71 even in the case of the external coupling. Moreover, the administrator can also replace the storage drive 22 only by accessing any of the virtual SVPs 71.

<Mapping Management Table>

The SVP virtualization mechanism manages the extent of maintenance and management by each of the virtual SVPs 71 in a mapping management table 800 that is one of the management tables 2023 shared by the virtual SVPs 71.

FIGS. 8 to 10 show examples of the mapping management table 800. Each of the mapping management tables 800 includes one or more records having items including virtual SVP 811, physical SVP 812, storage apparatus 813, RAID group 814 and LDEV 815.

In the virtual SVP 811 among the above items, an identifier uniquely assigned to each of the virtual SVPs 71 (hereinafter referred to as the virtual SVP-ID) is set. In the physical SVP 812, an identifier of the SVP 20 configuring the virtual SVP 71 (hereinafter referred to as the physical SVP-ID) is set. In the storage apparatus 813, an identifier of the storage apparatus 10 to be managed by the virtual SVP 71 (hereinafter referred to as the storage apparatus ID) is set. In the RAID group 814, an identifier of a RAID group to be managed by the virtual SVP 71 (hereinafter referred to as the RAID group ID) is set. In the LDEV 815, an identifier of the LDEV 25 to be managed by the virtual SVP 71 (hereinafter referred to as the LDEV-ID) is set.

The mapping management table 800 shown in FIG. 8 is an example when the external coupling described above is not performed. This mapping management table 800 manages the information that the virtual SVP 71 having the virtual SVP-ID "V-SVP1" configured by the SVP 20 having the physical SVP-ID "SVP1" present in the storage apparatus 10 having the storage apparatus ID "XXXX-XX1" is responsible for all the RAID groups and all the LDEVs 25 in the storage apparatus 10 having the storage apparatus ID "XXXX-XX1".

The mapping management table 800 also manages the information that the virtual SVP 71 having the virtual SVP-ID "V-SVP2" configured by the SVP 20 having the physical SVP-ID "SVP2" present in the storage apparatus 10 having the storage apparatus ID "XXXX-XX2" is responsible for all the RAID groups and all the LDEVs 25 in the storage apparatus 10 having the storage apparatus ID "XXXX-XX2".

The mapping management table 800 also manages the information that the virtual SVP 71 having the virtual SVP-ID "V-SVP3" configured by the SVP 20 having the physical SVP-ID "SVP3" present in the storage apparatus 10 having the storage apparatus ID "XXXX-XX3" is responsible for all the RAID groups and all the LDEVs 25 in the storage apparatus 10 having the storage apparatus ID "XXXX-XX3".

The mapping management table 800 shown in FIG. 9 is an example in which the external coupling described above is performed. The mapping management table 800 manages the information that the virtual SVP 71 having the virtual SVP-ID "V-SVP1" configured by the SVP 20 having the physical SVP-ID "SVP1" present in the storage apparatus 10 having the storage apparatus ID "XXXX-XX1" is responsible for all the LDEVs in all the RAID groups in the storage apparatus 10 having the storage apparatus ID "XXXX-XX1", for all the LDEVs 25 in the RAID group having the RAID group ID "0" among the RAID groups in the storage apparatus 10 having the storage apparatus ID "XXXX-XX2", and for the LDEVs 25 having the LDEV-IDs "0" and "1" in the RAID group having the RAID group ID "1" among the RAID groups in the storage apparatus 10 having the storage apparatus ID "XXXX-XX2".

The mapping management table 800 also manages the information that the virtual SVP 71 having the virtual SVP-ID "V-SVP2" configured by the SVP 20 having the physical SVP-ID "SVP2" present in the storage apparatus 10 having the storage apparatus ID "XXXX-XX2" is responsible for the LDEVs 25 having the LDEV-IDs "2" and "3" in the RAID group having the RAID group ID "1" among the RAID groups in the storage apparatus 10 having the storage apparatus ID "XXXX-XX2" and for all the LDEVs 25 in the RAID groups having the RAID group IDs "2", "3", "4" and "5" among the RAID groups in the storage apparatus 10 having the storage apparatus ID "XXXX-XX2".

This mapping management table 800 also manages the information that the virtual SVP 71 having the virtual SVP-ID "V-SVP3" configured by the SVP 20 having the physical SVP-ID "SVP3" present in the storage apparatus 10 having the storage apparatus ID "XXXX-XX3" is responsible for all the LDEVs 25 in all the RAID groups in the storage apparatus 10 having the storage apparatus ID "XXXX-XX3".

The mapping management table 800 shown in FIG. 10 is another example when the external coupling described above is performed. In this example, the virtual SVP 71 having the virtual SVP-ID "V-SVP1" and the virtual SVP 71 having the virtual SVP-ID "V-SVP2" are both configured by the SVP 20 having the physical SVP-ID "SVP1" present in the storage apparatus 10 having the storage apparatus ID "XXXX-XX1". Moreover, the virtual SVP 71 having the virtual SVP-ID "V-SVP3" is configured by the SVP 20 having the physical SVP-ID "SVP2" present in the storage apparatus 10 having the storage apparatus ID "XXXX-XX4".

The mapping management table 800 manages the information that the virtual SVP 71 having the virtual SVP-ID "V-SVP1" is responsible for all the LDEVs 25 in all the RAID groups in the storage apparatus 10 having the storage apparatus ID "XXXX-XX1", for all the LDEVs 25 in the RAID group having the RAID group ID "0" among the RAID groups in the storage apparatus 10 having the storage apparatus ID "XXXX-XX2", and for the LDEVs 25 having the LDEV-IDs "0" and "1" in the RAID group having the RAID group ID "1" among the RAID groups in the storage apparatus 10 having the storage apparatus ID "XXXX-XX2".

The mapping management table 800 also manages the information that the virtual SVP 71 having the virtual SVP-ID "V-SVP2" is responsible for the LDEVs 25 having the LDEV-IDs "2" and "3" in the RAID group having the RAID group ID "1" among the RAID groups in the storage apparatus 10 having the storage apparatus ID "XXXX-XX3" and for all the LDEVs 25 in the RAID groups having the RAID group IDs "2", "3", "4" and "5" among the RAID groups in the storage apparatus 10 having the storage apparatus ID "XXXX-XX3".

The mapping management table 800 also manages the information that the virtual SVP 71 having the virtual SVP-ID "V-SVP3" is responsible for all the LDEVs 25 in all the RAID groups in the storage apparatus 10 having the storage apparatus ID "XXXX-XX4"

<Mapping Management Table Setup>

The contents in the mapping management table 800 described above can be set by the administrator operating the maintenance apparatus 2 and accessing the virtual SVP 71.

Figure 11:
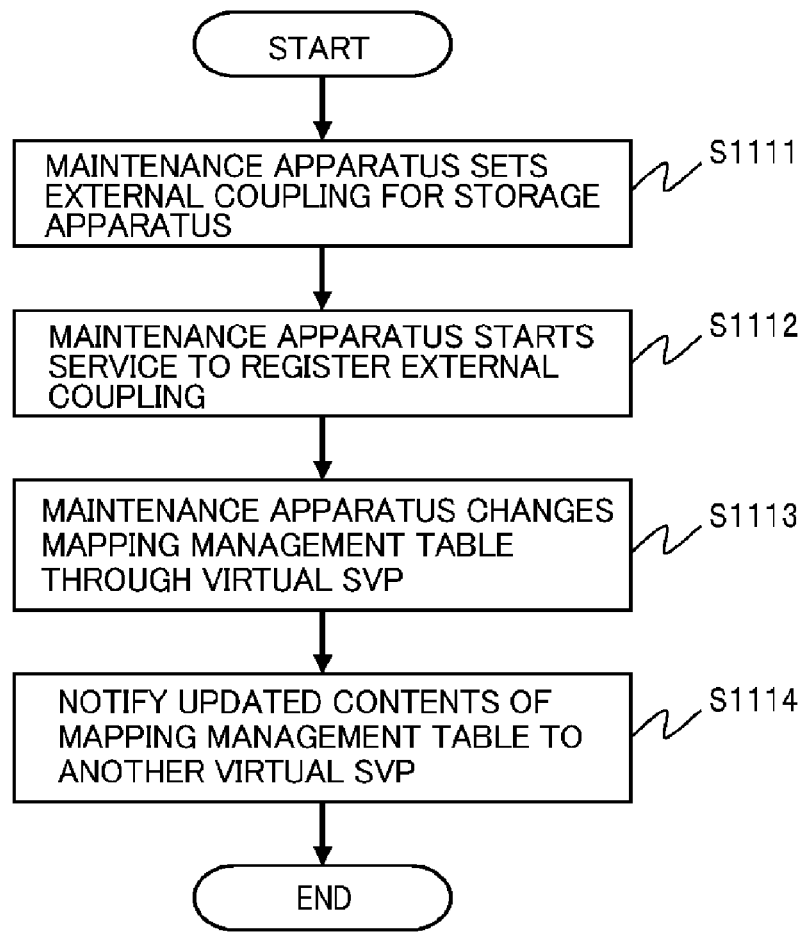
FIG. 11 is a flowchart showing an external coupling setting process S1100.

FIG. 11 is a flowchart showing a process performed by the administrator when he/she sets up the mapping management table 800 through the virtual SVP 71 by operating the maintenance apparatus 2 to set the external coupling (hereinafter referred to as an external coupling setting process S1100).

As shown in FIG. 11, the maintenance apparatus 2, in response to the administrator's operation, performs settings of the storage apparatus 10, which are required to set the external coupling to the storage apparatus 10 through the virtual SVP 71 (S1111). For example, the administrator previously gets a setting done to allow the location of a storage area provided by another storage apparatus 10 to correspond to an address space of a storage area provided to the host computer 3.

Next, the maintenance apparatus 2, in response to the administrator's operation, starts a service for setting the external coupling (S1112), and changes the contents of the mapping management table 800 (S1113).

Here, in the changing, the maintenance apparatus 2 changes the contents of the mapping management table 800 by accessing the virtual SVP 71 responsible for the LDEV 25 involved in the external coupling. For example, in the mapping management table 800 shown in FIG. 8, in the case of externally coupling the LDEVs 25 in the storage apparatus 10 having the storage apparatus ID "XXXX-XX2" to the storage apparatus 10 having the storage apparatus ID "XXXX-XX1", the maintenance apparatus 2 accesses the virtual SVP 71 having the virtual SVP-ID "V-SVP1" to change the contents of the mapping management table 800 through the virtual SVP 71.

Subsequently, the virtual SVP 71 to manage the LDEV 25 involved in the external coupling notifies a different virtual SVP 71 that the contents of the mapping management table 800 are changed (S1114). Accordingly, the management tables 2023 in the memories 202 of all the SVPs 20 configuring the virtual SVPs 71 are updated, and the contents of the updated mapping management table 800 are shared by all the virtual SVPs 71. For example, in the mapping management table 800 shown in FIG. 8, in the case of externally coupling the LDEVs 25 in the storage apparatus 10 having the storage apparatus ID "XXXX-XX2" to the storage apparatus 10 having the storage apparatus ID "XXXX-XX1", the contents of the mapping management table 800 are updated to those shown in FIG. 9, and the contents of the updated mapping management table 800 are shared by all the virtual SVPs 71. Moreover, setting of the storage apparatus 10 required for external coupling in S1111, may be performed concurrently with the changing of the mapping management table 800, rather than beforehand.

As described above, in the storage system 1 of the present embodiment, the contents of the mapping management table 800 can be set using one of the virtual SVPs 71. As a result, the administrator can easily perform the setup of the external coupling without accessing both of the SVP 20 in the recipient storage apparatus and the SVP 20 in the provider storage apparatus.

<Replacement of Storage Drive>

Figure 12:
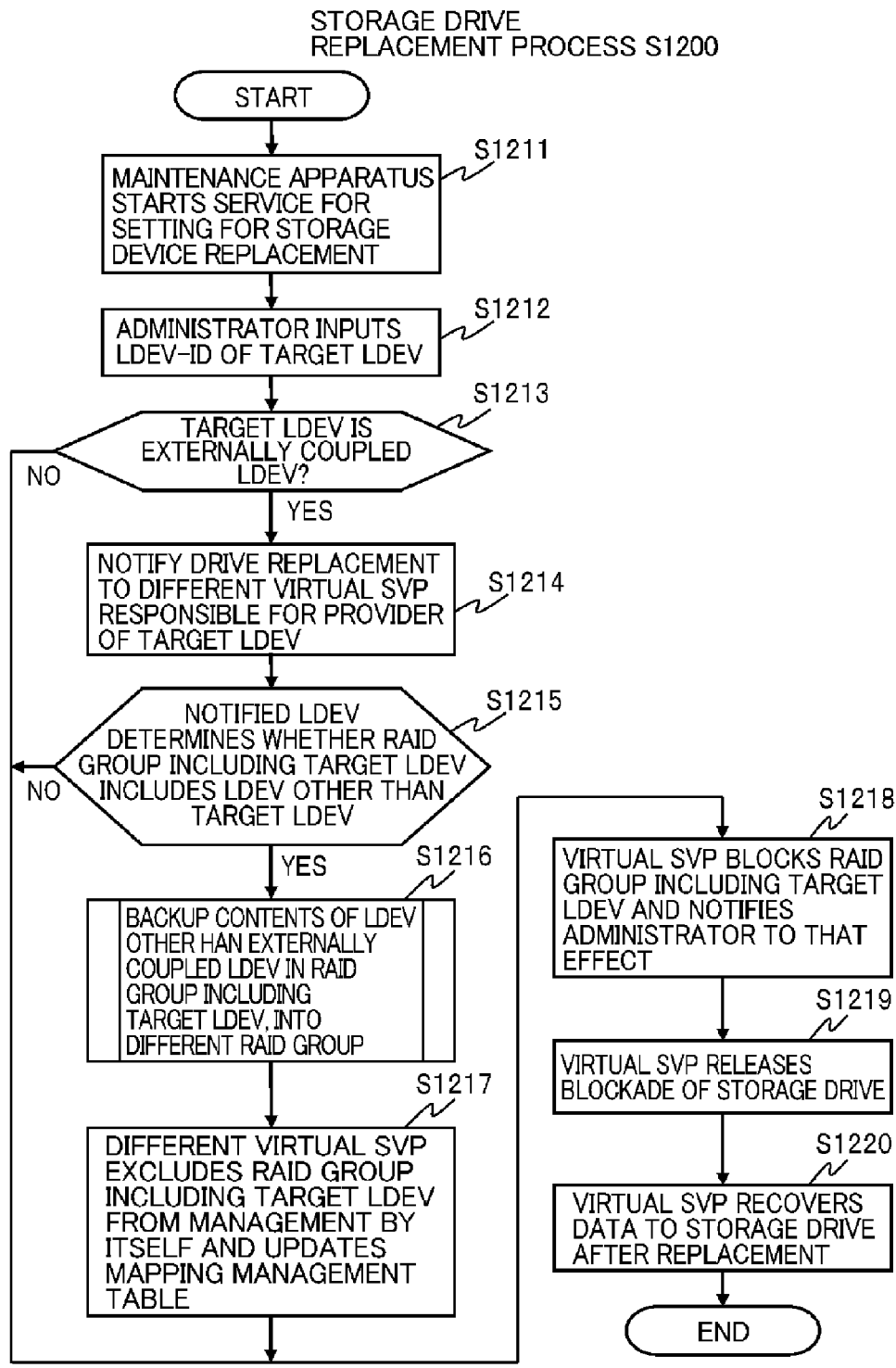
FIG. 12 is a flowchart showing a storage drive replacement process S1200.

Next, description is given of another process performed through the virtual SVP 71. FIG. 12 is a flowchart showing a process of replacing the storage drive 22 in the LDEV 25 (the LDEV 25 having the LDEV-ID "0" or "1") included in the RAID group having the RAID group ID "1" in the storage apparatus 10 having the storage apparatus ID "XXXX-XX2" when the mapping management table 800 has the contents shown in FIG. 9 (hereinafter referred to as a storage drive replacement process S1200). The storage drive replacement process S1200 is described below with reference to FIG. 12.

First, the maintenance apparatus 2 in response to the administrator's operation starts a service for the settings for the replacement of the storage drive 22 among the services provided by the management application 70 (S1211), and then inputs the LDEV-ID corresponding to the storage drive 22 to be replaced (hereinafter referred to as the target LDEV) through the service (S1212). In response to this, the maintenance apparatus 2 notifies the inputted LDEV-ID to the virtual SVP 71 (the virtual SVP 71 having the virtual SVP-ID "V-SVP1" in FIG. 9) responsible for the LDEVs 25 involved in the replacement using the service.

Upon receipt of the LDEV-ID of the target LDEV, the virtual SVP 71 determines whether or not the LDEV 25 of the target LDEV is the externally coupled LDEV 25, by referring to the mapping management table 800 (S1213). If the target LDEV is the externally coupled LDEV 25 (S1213: YES), the processing proceeds to S1214. On the other hand, if the target LDEV is not the externally coupled LDEV 25 (S1213: NO), the processing proceeds to S1218.

In S1214, the virtual SVP 71 notifies a different virtual SVP 71 (the virtual SVP 71 having the virtual SVP-ID "V-SVP2" in the case of FIG. 9) responsible for the provider of the target LDEV that the storage drive 22 is to be replaced.

In S1215, the notified different virtual SVP 71 determines whether or not the LDEVs 25 included in the RAID group including the target LDEV includes an LDEV other than the target LDEV (the externally coupled LDEV 25) by referring to the mapping management table 800.

If the LDEVs 25 included in the RAID group including the target LDEV includes the LDEV other than the target LDEV (S1215: YES), the processing proceeds to S1216. On the other hand, if there is not any such LDEV (S1215: NO), the processing proceeds to S1218.

For example, in the case of FIG. 9, the RAID group having the RAID group ID "1" includes also the LDEVs 25 having the LDEV-IDs "2" and "3" other than the externally coupled LDEVs 25 having the LDEV-IDs "0" and "1". Thus, it is determined that the RAID group configured using the target LDEV includes the LDEVs 25 (the LDEVs 25 having the LDEV-IDs "2" and "3").

In S1216, a different virtual SVP 71 backs up (replicates) the contents on the LDEV 25 (hereinafter referred to as a backup-requiring LDEV) other than the externally coupled LDEV 25 in the RAID group configured to include the target LDEV, in another RAID group (here, the RAID group managed by the different virtual SVP 71).

For example, when the mapping management table 800 has the contents shown in FIG. 9, the different virtual SVP 71 backs up (replicates) the contents on the LDEVs 25 having the LDEV-IDs "2" and "3" into at least one of the RAID groups having the RAID group IDs "2", "3", "4" and "5". Note that details of the process performed here are described later with reference to FIG. 14.

Next, in S1217, the different virtual SVP 71 updates the contents of the mapping management table 800 to those having the RAID group having the RAID group ID "1" excluded from management by the different virtual SVP 71. Thus, for example, the contents of the mapping management table 800 shown in FIG. 9 are updated to those of the mapping management table 800 shown in FIG. 13.

In S1218, the virtual SVP 71 that manages the target LDEV (the virtual SVP 71 having the virtual SVP-ID "V-SVP1" in FIG. 9) blocks the RAID group (the RAID group having the RAID group ID "1") including the target LDEV (i.e., shuts off the I/O request from the host computer 3 to the RAID group) and notifies the administrator to that effect. The administrator replaces the storage drive 22 after confirming that the RAID group including the target LDEV is blocked.

Upon detection or receipt that the replacement of the storage drive 22 has been completed, the virtual SVP 71 responsible for the target LDEV releases the blockade of the RAID group including the target LDEV (S1219), and performs processes required for recovery such as replicating (e.g., correction copy) data required for the storage drive 22 after replacement (S1220). Note that, at S1220 the maintenance apparatus, in response to the administrator's operation, may perform the operation required for recovery, such as copy (e.g., correction copy) of data required for the replaced storage drive 22, by operating the maintenance apparatus 2.

Figure 14:
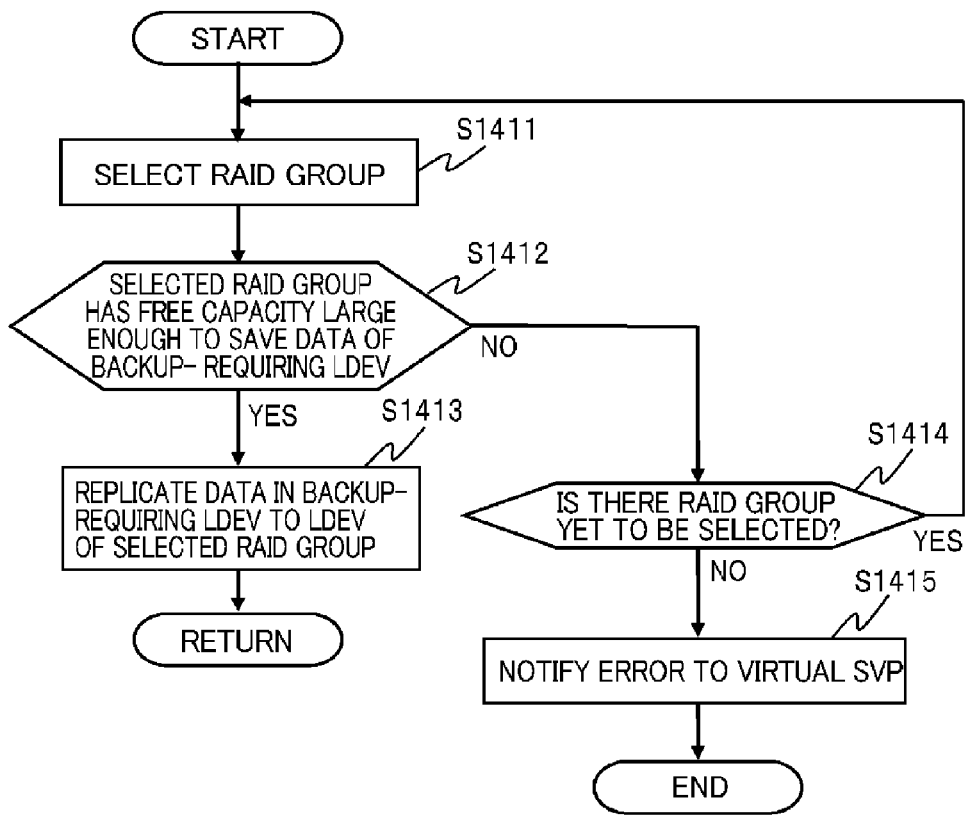
FIG. 14 is a flowchart showing an LDEV backup process S1400.

FIG. 14 is a flowchart showing details of a process performed when the different virtual SVP 71 backs up (replicates) the contents on the backup-requiring LDEV into another RAID group managed by the different virtual SVP 71 (hereinafter referred to as an LDEV backup process S1400). The LDEV backup process S1400 is described below with reference to FIG. 14.

First, a different virtual SVP 71 selects a RAID group other than the RAID group configured using the backup-requiring LDEV (S1411). For example, when the mapping management table 800 has the contents shown in FIG. 9, the different virtual SVP 71 selects any one of the RAID groups having the RAID group IDs "2", "3", "4" and "5".

Next, the different virtual SVP 71 determines whether or not the selected RAID group has a free capacity in which the data stored in the backup-requiring LDEV can be backed up (S1412). This determination is made by referring to a free capacity management table 1500 that is one of the management tables 2023 shared by the virtual SVPs 71.

FIG. 15 shows an example of the free capacity management table 1500. As shown in FIG. 15, the free capacity management table 1500 includes one or more records having items including virtual SVP 1511, physical SVP 1512, storage apparatus 1513, RAID group 1514, RAID group storage capacity 1515, LDEV 1516, and LDEV usage 1517.

In the virtual SVP 1511 among the above items, a virtual SVP-ID is set. In the physical SVP 1512, a physical SVP-ID of a SVP 20 configuring the virtual SVP 71 is set. In the storage apparatus 1513, a storage apparatus ID of the storage apparatus 10 managed by the virtual SVP 71 is set. In the RAID group 1514, a RAID group ID of the RAID group managed by the virtual SVP 71 is set. In the RAID group storage capacity 1515, a total storage capacity (GB) of the RAID group is set. In the LDEV 1516, an LDEV-ID of the LDEV 25 included in the RAID group is set. In the LDEV usage 1517, the current usage (GB) of the LDEV 25 is set.

If the different virtual SVP 71 determines, in the above determination, that the selected RAID group has free capacity in which the data stored in the backup-requiring LDEV can be backed up (S1412: YES), the different virtual SVP 71 replicates the data stored in the backup-requiring LDEV into the LDEV 25 in the RAID group selected in S1411 (S1413). Then, the processing returns to FIG. 12.

On the other hand, if the different virtual SVP 71 determines, in the above determination, that the selected RAID group does not have free capacity in which the data stored in the backup-requiring LDEV can be backed up (S1412: NO), the different virtual SVP 71 determines whether or not there is a RAID group yet to be selected in S1411 (S1414). If there is the RAID group yet to be selected (S1414: YES), the processing returns to S1411. On the other hand, if all the RAID groups are selected (S1414: NO), the different virtual SVP 71 notifies the virtual SVP 71 responsible for the LDEVs 25 involved in the replacement (the virtual SVP 71 having the virtual SVP-ID "V-SVP1" in FIG. 9) of an error (i.e., notifies that the data stored in the backup-requiring LDEV cannot be backed up) (S1415).

As described above, the administrator can replace the storage drive 22 by accessing the virtual SVP 71 responsible for maintenance and management of the storage drive 22 to be replaced. Conventionally, for the replacement of the storage drive 22, the administrator needed to access both the SVP 20 in the recipient storage apparatus and the SVP 20 in the provider storage apparatus to block the RAID group and change the contents of the tables held in both the SVPs 20 one by one. However, the storage drive replacement process S1200 described above enables the administrator to easily replace the storage drive 22 by using one of the virtual SVPs 71.

=Setting of Network Port of Channel Control Unit=

Figure 16:
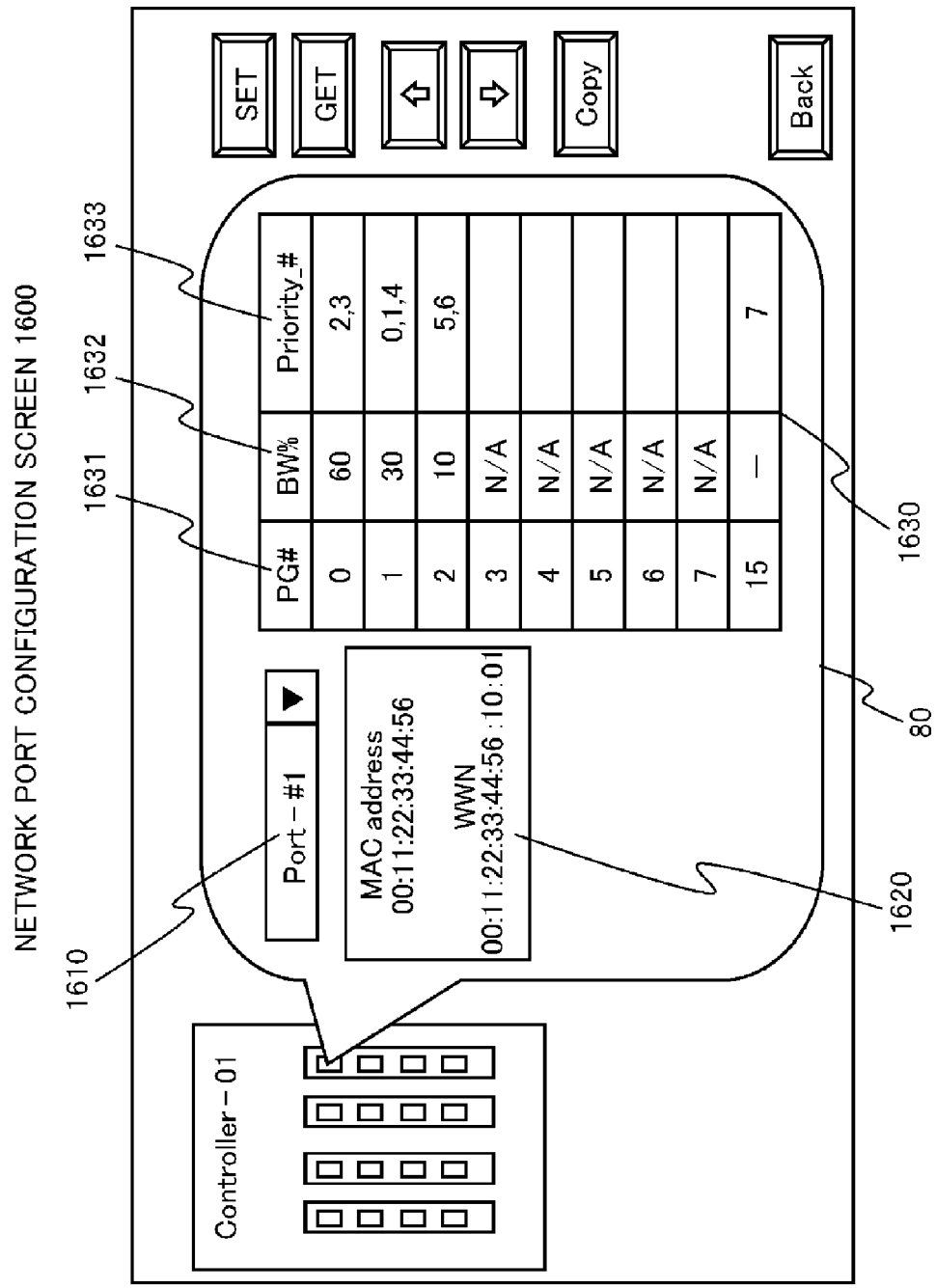
FIG. 16 is a diagram showing an example of a network port configuration screen 1600.

Next, description is given of a function for setting of the network port of the channel control unit 12, which is performed using the virtual SVP 71. FIG. 16 shows an example of a screen (hereinafter referred to as a network port configuration screen 1600) displayed by the maintenance apparatus 2 when the administrator performs the setting of the network port of the channel control unit 12 by accessing the virtual SVP 71 from the maintenance apparatus 2. The administrator can set a bandwidth of the network port of the channel control unit 12 for each of the communication protocols by inputting data required for the network port configuration screen 1600 and performing predetermined operations.

As shown in FIG. 16, a selection field 1610 for the network port of the channel control unit 12, a display field 1620 for information on the network port that is being selected (e.g., a MAC address of the network port and a WWN (World Wide Name) are displayed), and a setting field 1630 for a bandwidth for each priority group are provided in a balloon 80 at the center of the network port configuration screen 1600. Note that the priority group means a communication protocol group for which a common bandwidth is set. One or more communication protocols can be set for each priority group.

In "PG#" column 1631 in the bandwidth setting field 1630, an identifier of the priority group (hereinafter referred to as a PGID) is displayed. In "BW%" column 1632, a bandwidth set for the priority group is set. In "Priority_#" column 1633, an identifier corresponding to the type of the communication protocol (e.g., TCP/IP, FCoE, iSCSI or the like) belonging to the priority group (hereinafter referred to as a protocol ID) is set. The communication protocol (the communication protocol having the protocol ID "7" in FIG. 16) set in the last row (the row having the PGID "15") of the bandwidth setting field 1630 is not subjected to bandwidth control, and a frame (packet) having the communication protocol is transmitted/received through the network port with first priority.

The contents of the bandwidth for each communication protocol set through the network port configuration screen 1600 are set in the channel control unit 12 by the virtual SVP 71. The channel control unit 12 performs the bandwidth control for each communication protocol of each network port according to the set contents.

<Automatic Setting of Bandwidth>

The CPU 15 of the controller 11 obtains rates of data transmission amount (hereinafter referred to as the data transmission rate) among the priority groups, based on the amount of transmitted data (data transmission amount) of frames (packets) passing through each network port of the channel control unit 12 for each communication protocol for a predetermined time. Then, the virtual SVP 71 performs bandwidth setting for each communication protocol of the network port of the channel control unit 12, based on the obtained data transmission rate. This setting is performed, for example, when a preset time comes. Alternatively, the setting is performed regularly at preset time intervals.

FIG. 17 is a flowchart showing a process performed by the CPU 15 of the controller 11 when obtaining the data transmission rate between the priority groups (hereinafter referred to as a data transmission rate calculation process S1700). The data transmission rate calculation process S1700 is described below with reference to FIG. 17.

First, the CPU 15 acquires the amount of data transmitted for each communication protocol per predetermined time of a frame (packet) passing through each network port (S1711).

Next, the CPU 15 obtains a data transmission rate of each priority group based on the acquired data transmission amount, and stores it in the memory 16 (or the shared memory 18) (S1712).

FIG. 18 shows an example of a table managing the data transmission rate of each priority group (hereinafter referred to as a data transmission rate management table 1800) stored in the memory 16 (or the shared memory 18) by the CPU 15 through the data transmission rate calculation process S1700.

In "PG#" column 1811 in the data transmission rate management table 1800, the PGID described above is set. In "BW %" column 1812, a bandwidth currently set for the priority group is set. In "Priority_#" column 1813, a protocol ID of the communication protocol belonging to the priority group is set. In "Rate%" column 1814, the data transmission rate of the priority group obtained by the CPU 15 is set.

Figure 19:
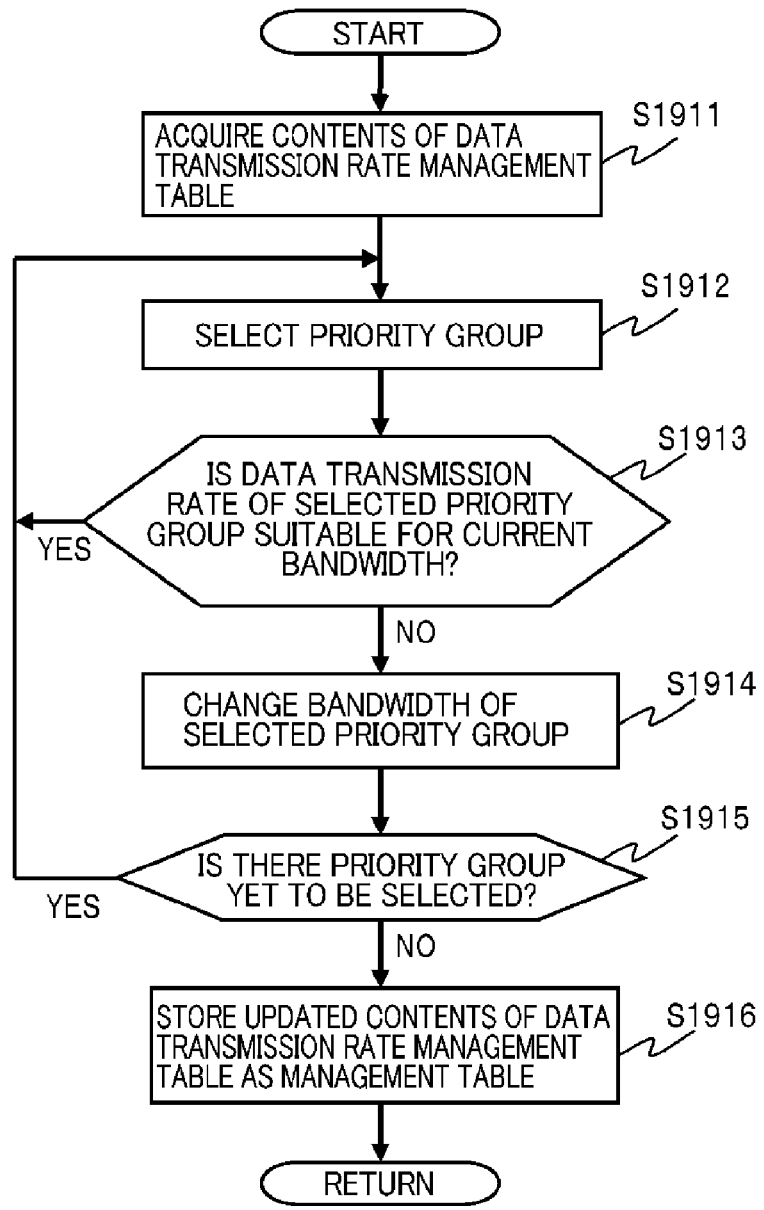
FIG. 19 is a flowchart showing a bandwidth automatic setting process S1900.

FIG. 19 is a flowchart showing a process performed by the virtual SVP 71 to set the bandwidth for each communication protocol of the network port of the channel control unit 12, based on the data transmission rate obtained as described above (hereinafter referred to as a bandwidth automatic setting process S1900). The bandwidth automatic setting process S1900 is described below with reference to FIG. 19.

First, the virtual SVP 71 acquires the contents of the data transmission rate management table 1800 stored in the memory 16 (or the shared memory 18) of the controller 11 (S1911).

Next, the virtual SVP 71 selects one of the priority groups managed in the data transmission rate management table 1800 (however, the priority group having the PGID "15" is excluded from choice) (S1912).

Thereafter, the virtual SVP 71 determines whether or not the data transmission rate of the selected priority group is suitable for the currently set bandwidth (S1913). Here, this determination is made by checking if a difference between the data transmission rate of the selected priority group and the percentage of the currently set bandwidth (the ratio (percentage) of the bandwidth currently set in the priority group to the total bandwidth of the network port) is within a predetermined allowable range.

If the virtual SVP 71 determines that the data transmission rate of the selected priority group is not suitable for the currently set bandwidth (S1913: NO), the processing proceeds to S1914. On the other hand, if the virtual SVP 71 determines that the data transmission rate of the selected priority group is suitable for the currently set bandwidth (S1913: YES), the processing returns to S1912 where the virtual SVP 71 repeats the processing for other priority groups yet to be selected.

In S1914, the virtual SVP 71 accesses the channel control unit 12 to change the bandwidth of the priority group that is being selected to a value corresponding to the current data transmission rate of the priority group. To be more specific, the virtual SVP 71 changes the setting of the bandwidth of the priority group that is being selected so that the percentage of the bandwidth becomes suitable for the current data transmission rate of the priority group.

In S1915, the virtual SVP 71 determines whether or not there is any priority group yet to be selected in S1912. If there is the priority group yet to be selected (S1915: YES), the processing returns to S1912 where the virtual SVP 71 repeats the processing for other priority groups yet to be selected.

On the other hand, if there is no more priority group yet to be selected (S1915: NO), the virtual SVP 71 stores the data transmission rate management table 1800 having the changed bandwidth set therein in the SVP 20 as the management table 2023.

FIG. 20 shows an example of the data transmission rate management table 1800 after the change from the state shown in FIG. 18. In this example, the bandwidth of the priority group having the PGID "0" is changed from "60" to "40" and the bandwidth of the priority group having the PGID "1" is changed from "30" to "50" according to the change in the data transmission rate.

As described above, the virtual SVP 71 automatically performs setting of the bandwidth for each communication protocol of the network port based on the transmission rate. Thus, the bandwidth for each communication protocol of the network port of the channel control unit 12 can be automatically set to a suitable value according to the actual traffic conditions. Moreover, since the virtual SVPs 71 share the data transmission rate management table 1800 having the changed bandwidth set therein as the management table 2023, the administrator, for example, can set the bandwidth for each communication protocol of the network port of the channel control unit 12 through a different virtual SVP 71 even if a failure occurs in a certain virtual SVP 71.

Note that when the channel control unit 12 and the network switch included in the I/O network 5 have a function to share control information by transmitting and receiving the control information to and from each other, the set value of the bandwidth for each communication protocol set for the network port of the channel control unit 12 is sequentially propagated to the network switch included in the I/O network 5 by the function. Thus, control according to the current operation status of the storage apparatus 10 is performed for the I/O network 5 that has been conventionally outside the management range of the storage apparatus 10.

Moreover, as described above, the channel control unit 12 and the I/O network 5 are communicatively coupled to each other through the network device 7. Thus, the virtual SVP 71 can also set, through the network device 7, the bandwidth for each communication protocol of the network port included in the network switch in the I/O network 5, based on the data transmission rate of the network port acquired from the channel control unit 12. More specifically, the virtual SVP 71 can perform the control according to the current operation status of the storage apparatus 10 directly on the I/O network 5.

Note that, in this case, the virtual SVPs 71 may share the data transmission rate management table 1800 having the changed bandwidth set therein as the management table 2023. Thus, the administrator can set the bandwidth for each communication protocol of the network port of the network switch included in the I/O network 5 through a different virtual SVP 71 even if a failure occurs in a certain virtual SVP 71.

<Manual Setting of Bandwidth>

Figure 21:
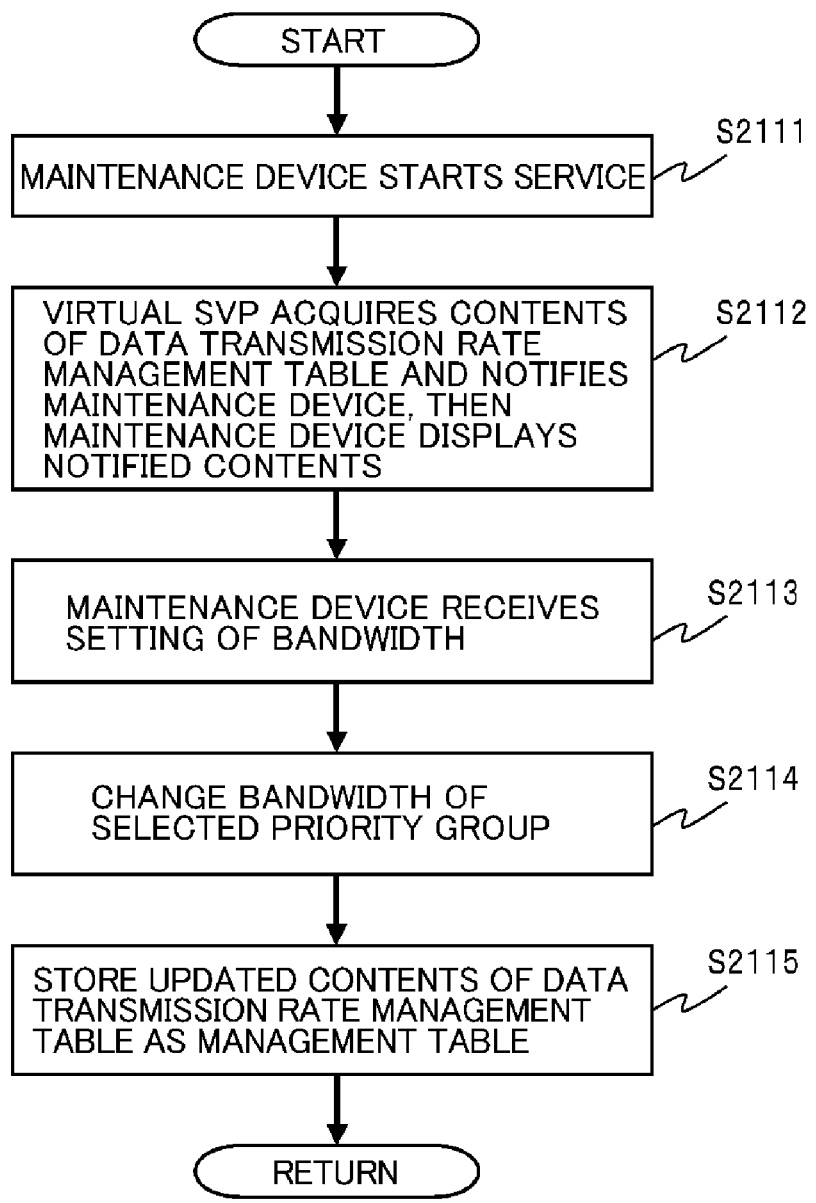
FIG. 21 is a flowchart showing a bandwidth manual setting process S2100.

The setting of the bandwidth for each communication protocol of the network port of the channel control unit 12 can also be manually performed by the administrator accessing the virtual SVP 71. FIG. 21 is a flowchart showing procedures when manually setting the bandwidth for each communication protocol of the network port of the channel control unit 12 (hereinafter referred to as a bandwidth manual setting process S2100). The bandwidth manual setting process S2100 is described below with reference to FIG. 21.

First, the maintenance apparatus 2, in response to a administrator's operation, starts a service for setting a bandwidth for each communication protocol of the network port of the network control unit 12 (S2111).

Next, when the administrator performs a predetermined operation to the maintenance apparatus 2, the virtual SVP 71 acquires the contents of the data transmission rate management table 1800 stored in the memory 16 (or the shared memory 18) of the controller 11 and notifies the maintenance apparatus 2 to that effect, and then the maintenance apparatus 2 displays the notified contents of the data transmission rate management table 1800 (S2112).

Then, the maintenance apparatus 2 receives a suitable bandwidth setting for the priority group from the administrator that has confirmed the displayed contents (the data transmission rate of the priority group) (S2113).

The maintenance apparatus 2 notifies the virtual SVP 71 of the set contents, and the notified virtual SVP 71 accesses the channel control unit 12 to change the bandwidth of the priority group to a new content (S2114).

Thereafter, the virtual SVP 71 stores the data transmission rate management table 1800 having the changed bandwidth set therein in the SVP 20 as the management table 2023 (S2115).

As described above, the setting of the bandwidth for each communication protocol of the network port of the channel control unit 12 can be manually performed. Thus, the administrator can easily set the bandwidth for each communication protocol of the network port of the channel control unit 12. Moreover, since the virtual SVPs 71 share the data transmission rate management table 1800 having the changed bandwidth set therein as the management table 2023, the administrator, for example, can set the bandwidth for each communication protocol of the network port of the channel control unit 12 through a different virtual SVP 71 even if a failure occurs in a certain virtual SVP 71.

Furthermore, the channel control unit 12 and the I/O network 5 are communicatively coupled to each other through the network device 7. Thus, the administrator can also set, through the network device 7, the bandwidth for each communication protocol of the network port included in the network switch in the I/O network 5, based on the data transmission rate of the network port acquired from the channel control unit 12. More specifically, the administrator can perform the control according to the current operation status of the storage apparatus 10 directly on the I/O network 5.

While the embodiments of the present invention have been described above, the embodiments are intended to facilitate the understanding of the present invention and not to limit the scope thereof. The present invention may be altered and modified without departing from the spirit of the invention, and also includes equivalents thereof.

The invention claimed is:

1. A storage system comprising:
at least one storage apparatus
being communicatively coupled to a host computer through an input/output (I/O) network, and
being configured to perform an I/O process for a storage drive in response to an I/O request sent from the host computer;
the at least one storage apparatus has a logical device (LDEV) of another storage apparatus externally coupled thereto, and the storage system including the another storage apparatus;
the at least one storage apparatus including at least one management device each being an information processor and communicatively coupled to constituent elements of the at least one storage apparatus,
at least two management devices being communicatively coupled to each other through a management network,
the at least one management device including a management device virtualization mechanism for implementing at least one virtual management device being a virtual object based on resources of the at least two management devices, wherein
the at least one virtual management device provides a maintenance environment for the constituent elements of the at least one storage apparatus, to a maintenance apparatus as an information processor accessing the at least one virtual management device through the management network; and
the at least one management device includes a mapping management table, and the mapping management table manages relations between LDEVs managed by management devices and storage apparatuses that provide the LDEVs;
wherein when a target storage drive of a target LDEV provided by the another storage apparatus externally coupled to the at least one storage apparatus is replaced, the at least one management device is configured to:
receive a request to replace; and
notify the target LDEV to another management device of the another storage apparatus,
wherein when the another management device is notified of the target LDEV, the another management device is configured to:
replicate, if a target redundant array of inexpensive disks (RAID) group providing the target LDEV includes another LDEV, contents on the another LDEV to different RAID group from the target RAID group; and
update the mapping management table, and
wherein when the target storage drive is replaced, the at least one management device is configured to:
block the target RAID group;
release the target RAID group, after replacement of the target storage drive; and
perform an operation of recovery of the target storage drive.

2. The storage system according to claim 1, wherein
each of the at least one virtual management device shares information related to management of the constituent elements held by each of the at least one management device through the management network.

3. The storage system according to claim 1, wherein
the at least one storage apparatus includes a storage apparatus virtualization mechanism for implementing a virtual storage apparatus being a virtual object based on resources of at least two storage apparatuses, and
the virtual storage apparatus provides the host computer with an access environment to the at least one storage apparatus.

4. The storage system according to claim 3, wherein
the at least one virtual management device provides the maintenance apparatus with a maintenance environment for the constituent elements by communicating with the constituent elements of the at least one storage apparatus through the virtual storage apparatus.

5. The storage system according to claim 3, wherein
the virtual storage apparatus provides an integrated access environment to storage drives targeted for I/O processes by each of a plurality of storage apparatuses.

6. The storage system according to claim 5, wherein
the plurality of storage apparatuses provide the host computer with a storage area of a redundant array of inexpensive disks (RAID) group configured using the storage drives,
when a first virtual management device blocks a particular storage drive targeted for an I/O process by the virtual storage apparatus for which the first virtual management device provides a maintenance environment, the first virtual management device notifies a second virtual management device that the particular storage drive is to be blocked, the second virtual management device providing a maintenance environment for a storage apparatus implementing the virtual storage apparatus, and
the second virtual management device backs up data in a different storage drive included in a same RAID group as the particular storage drive into a RAID group different from the same RAID group.

7. The storage system according to claim 6, wherein
through the management network, the first and second virtual management devices share information used to determine whether or not a RAID group as a backup destination has a free capacity large enough to backup the data in the different storage drive as a backup source for the backup.

8. The storage system according to claim 6, wherein
after the data in the different storage drive is backed up, the second virtual management device stops a provision of a maintenance environment for a RAID group including the particular storage drive to be blocked, and reflects the provision stoppage on information related to management of the constituent elements.

9. The storage system according to claim 1, wherein
the management device virtualization mechanism implements a plurality of virtual management devices based on the at least one management device included in each of the at least one storage apparatus and corresponding to respective management devices.

10. The storage system according to claim 1, wherein
the management device virtualization mechanism implements a plurality of virtual management devices based on one management device shared by a plurality of storage apparatuses.

11. The storage system according to claim 1, wherein
the at least one storage apparatus includes, as a constituent element, a channel control unit that is an interface for communication through the I/O network,
the channel control unit includes at least one network port for coupling to the I/O network,
the channel control unit acquires a data transmission amount per predetermined time for each communication protocol of the at least one network port, and
the at least one virtual management device acquires the data transmission amount for each communication protocol of the at least one network port from the channel control unit, and sets a bandwidth for each communication protocol of the at least one network port based on the acquired data transmission amount.

12. The storage system according to claim 11, wherein
each of the at least one virtual management device share the data transmission amount per predetermined time for each communication protocol of the at least one network port acquired from the channel control unit through the management network, and also share the setting of the bandwidth for each communication protocol of the at least one network port of the channel control unit.

13. The storage system according to claim 1, wherein
the at least one storage apparatus includes, as a constituent element, a channel control unit that is an interface for communication through the I/O network,
the channel control unit includes at least one network port for coupling to the I/O network,
the channel control unit acquires a data transmission amount per predetermined time for each communication protocol of the at least one network port,
the management network is communicatively coupled to the I/O network, and
the at least one virtual management device acquires the data transmission amount for each communication protocol of the at least one network port from the channel control unit, and sets a bandwidth for each communication protocol of a network port included in a network switch included in the I/O network, on the basis of the acquired data transmission amount.

14. The storage system according to claim 13, wherein
each of the at least one virtual management device share the data transmission amount per predetermined time for each communication protocol of the at least one network port acquired from the channel control unit through the management network, and also share the setting of the bandwidth for each communication protocol of the at least one network port included in the network switch included in the I/O network.

15. The storage system according to claim 1, wherein
the at least one storage apparatus includes, as the constituent elements,
a channel control unit that is an interface for communication through the I/O network,
a disk control unit that is an interface for communication with the storage drive,
a cache memory temporarily storing data to be written into the storage drive or data read from the storage drive, in the I/O process, and
a data controller having a processor responsible for performing data transfer between at least two of the channel control unit, the disk control unit and the cache memory.

16. The storage system according to claim 15, wherein
the at least one storage apparatus provides the host computer with a storage area of a RAID group configured using storage drives,
the at least one virtual management device performs at least one of configuration setting of the storage drives, setting of the RAID group, checking of operation statuses of the at least one storage apparatus and identification of failure locations, installation of an operating system to be executed by the channel control unit and installation of a microprogram to be executed by the channel control unit or the disk control unit.

17. The storage system according to claim 1, wherein
each of the at least one virtual management device share information related to management of the constituent elements held by each of the at least one management device through the management network,
the at least one storage apparatus includes a storage apparatus virtualization mechanism for implementing a virtual storage apparatus being a virtual object based on resources of at least two storage apparatuses,
the virtual storage apparatus provides the host computer with an access environment for the at least one storage apparatus,
the at least one virtual management device provides the maintenance apparatus with a maintenance environment for the constituent elements by communicating with the constituent elements of the at least one storage apparatus through the virtual storage apparatus, the virtual storage apparatus provides an integrated access environment to storage drives targeted for I/O processes by each of a plurality of storage apparatuses, the plurality of storage apparatuses provide the host computer with a storage area of a RAID group configured using the storage drives, when a first virtual management device blocks a particular storage drive targeted for an I/O process by the virtual storage apparatus for which the first virtual management device provides the maintenance environment, the first virtual management device notifies a second one virtual management device that the particular storage drive is to be blocked, the second virtual management device providing a maintenance environment for the at least one storage apparatus implementing the virtual storage apparatus, the second virtual management device backs up data in a different storage drive included in a same RAID group as the particular storage drive into a RAID group different from the same RAID group, through the management network, the first and second virtual management devices share information used to determine whether or not a RAID group of a backup destination has a free capacity large enough to backup the data in the different storage drive of a backup source for the backup, after the data in the different storage drive is backed up, the second virtual management device stops a provision of a maintenance environment for the RAID group including the particular storage drive to be blocked, and reflects the provision stoppage on information related to management of the constituent elements, the management device virtualization mechanism implements a plurality of virtual management devices based on the at least one management device included in each of the at least one storage apparatus and corresponding to respective management devices, or implements a plurality of the virtual management devices based on one management device shared by a plurality of storage apparatuses, the at least one storage apparatus includes, as the constituent elements, a channel control unit that is an interface for communication through the I/O network, the channel control unit includes at least one network port for coupling to the I/O network, the channel control unit acquires a data transmission amount per predetermined time for each communication protocol of the at least one network port, the at least one virtual management device acquires the data transmission amount for each communication protocol of the at least one network port from the channel control unit, and sets a bandwidth for each communication protocol of the at least one network port based on the acquired data transmission amount, each of the at least one virtual management device share the data transmission amount per predetermined time for each communication protocol of the at least one network port acquired from the channel control unit through the management network, and also share the setting of the bandwidth for each communication protocol of the at least one network port of the channel control unit, the management network is communicatively coupled to the I/O network, and the at least one virtual management device acquires the data transmission amount for each communication protocol of the at least one network port from the channel control unit, and sets a second bandwidth for each communication protocol of the at least one network port based on the acquired data transmission amount, each of the at least one virtual management device shares the data transmission amount per predetermined time for each communication protocol of the at least one network port acquired from the channel control unit through the management network, and also share the setting of the second bandwidth for each communication protocol of the at least one network port included in a network switch included in the I/O network, the at least one storage apparatus further includes, as the constituent elements, a disk control unit that is an interface for communication with a storage drive, a cache memory temporarily storing data to be written into a storage drive or data read from a storage drive, in a I/O process, a data controller having a processor responsible for performing data transfer between at least two of the channel control unit, the disk control unit and the cache memory, the at least one storage apparatus provides the host computer with a storage area of a RAID group configured using storage drives, and the at least one virtual management device performs at least one of configuration setting of storage drives, setting of RAID group, checking of operation statuses of the at least one storage apparatus and identification of failure locations, installation of an operating system to be executed by the channel control unit and installation of a microprogram to be executed by the channel control unit or the disk control unit.

18. A method for controlling a storage system including at least one storage apparatus being communicatively coupled to a host computer through an I/O network, being configured to perform an I/O process for a storage drive in response to an I/O request sent from the host computer, the at least one storage apparatus has an LDEV of another storage apparatus externally coupled thereto, the storage system including the another storage apparatus, the storage system including at least one management device each being an information processor provided in the at least one storage apparatus and communicatively coupled to constituent elements of the at least one storage apparatus, at least two management devices being communicatively coupled to each other through a management network, the at least one management device includes a mapping management table, and the mapping management table manages relations between LDEVs managed by management devices and storage apparatuses that provide the LDEVs, the method comprising:

implementing, by the at least two management devices, at least one virtual management device being a virtual object based on resources of the at least two management devices; and providing, by the at least one virtual management device, a maintenance environment for the constituent elements of the at least one storage apparatus to a maintenance apparatus as an information processor accessing the at least one virtual management device through the management network;

wherein when a target storage drive of a target LDEV provided by the another storage apparatus externally coupled to the at least one storage apparatus is replaced, the management device is configured to:

receive a request to replace; and notify the target LDEV to another management device of the another storage apparatus, wherein when the another management device is notified of the target LDEV, the another management device is configured to:

replicate, if a target RAID group providing the target LDEV includes another LDEV, contents on the another LDEV to different RAID group from the target RAID group; and update the mapping management table, and wherein when the target storage drive is replaced, the at least one management device is configured to:

block the target RAID group;

release the target RAID group, after replacement of the target storage drive; and perform an operation of recovery of the target storage drive.

19. The method for controlling a storage system, according to claim 18, wherein each of the at least one virtual management device share information related to management of the constituent elements held by each of the at least one management device through the management network.

20. The method for controlling a storage system, according to claim 18, wherein the at least one storage apparatus implements a virtual storage apparatus being a virtual object based on resources of at least two storage apparatuses, the virtual storage apparatus provides the host computer with an access environment to the at least one storage apparatus, the at least one virtual management device provides the maintenance apparatus with a maintenance environment for the constituent elements by communicating with the constituent elements of the at least one storage apparatus through the virtual storage apparatus, and the virtual storage apparatus provides an integrated access environment to storage drives targeted for I/O processes by each of a plurality of storage apparatuses.

* * * * *